United States Patent
Cheng

(10) Patent No.: US 9,787,177 B2
(45) Date of Patent: Oct. 10, 2017

(54) POWER OUTPUT CIRCUIT AND RELATED CONTROL METHOD

(71) Applicant: Sitronix Technology Corp., Hsinchu County (TW)

(72) Inventor: Chia-Chi Cheng, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 0 days.

(21) Appl. No.: 15/197,744

(22) Filed: Jun. 29, 2016

(65) Prior Publication Data

US 2017/0170724 A1    Jun. 15, 2017

Related U.S. Application Data

(60) Provisional application No. 62/265,968, filed on Dec. 10, 2015.

(51) Int. Cl.
*G06F 1/10* (2006.01)
*H02M 3/07* (2006.01)

(52) U.S. Cl.
CPC .................................. *H02M 3/07* (2013.01)

(58) Field of Classification Search
CPC .... H02M 3/07; H02M 2003/077; G11C 5/145
USPC ................ 327/534–537, 156–159, 540–544; 363/59, 60
See application file for complete search history.

(56) References Cited

U.S. PATENT DOCUMENTS

| 2005/0168263 | A1* | 8/2005 | Fukuda | H02M 3/073 327/535 |
| 2007/0018700 | A1* | 1/2007 | Yen | H02M 3/07 327/156 |
| 2012/0007682 | A1* | 1/2012 | Huang | H03L 7/0995 331/34 |
| 2015/0063042 | A1* | 3/2015 | Plavec | H02M 3/073 365/189.07 |

FOREIGN PATENT DOCUMENTS

| TW | 200836476 A | 9/2008 |
| TW | 201244344 A1 | 11/2012 |
| TW | 201505336 A | 2/2015 |

* cited by examiner

*Primary Examiner* — Thomas Skibinski
(74) *Attorney, Agent, or Firm* — Winston Hsu

(57) ABSTRACT

A power output circuit includes a charge pump, a voltage regulator, a clock generator and a voltage detector. The charge pump is used for receiving a clock signal having an operating frequency and outputting an output voltage. The voltage regulator, coupled to the charge pump, is used for outputting a control voltage to the charge pump, to control the output voltage. The clock generator, coupled to the charge pump, is used for outputting the clock signal to the charge pump. The voltage detector, coupled to the clock generator and the voltage regulator, is used for detecting the control voltage and controlling the clock generator to adjust the operating frequency of the clock signal according to a magnitude of the control voltage.

10 Claims, 5 Drawing Sheets

POWER OUTPUT CIRCUIT AND RELATED CONTROL METHOD

CROSS REFERENCE TO RELATED APPLICATIONS

This application claims the benefit of U.S. Provisional Application No. 62/265,968, filed on Dec. 10, 2015, the contents of which are incorporated herein by reference.

BACKGROUND OF THE INVENTION

1. Field of the Invention

The present invention relates to a power output circuit and a related control method, and more particularly, to a control method capable of adjusting an operating frequency of a charge pump in a power output circuit.

2. Description of the Prior Art

A charge pump, which is a common power supply circuit, may generate and output a voltage value higher than its input voltage. The voltage outputted by a charge pump may be of any magnification. For example, the input voltage may be multiplied by 2 or 3 and then outputted. If the charge pump is connected to a voltage regulator via a feedback circuit, the reference voltage in the voltage regulator may be used to realize a predetermined and stable output voltage.

In order to provide a higher output voltage, the charge pump may include capacitors for storing electric charges, and switching of a clock signal is applied to generate a higher voltage. Conventionally, a charge pump uses an external capacitor (i.e., a capacitor outside the chip) to store electric charges. The external capacitor has a larger capacitance and is capable of storing more electric charges; hence, a clock with a lower frequency is enough for providing a stable output voltage. In recent years, the external capacitor is gradually replaced by a built-in capacitor (i.e., a capacitor inside the chip) in order to reduce costs and minimize circuit areas. However, the built-in capacitor has a smaller capacitance value; hence, the clock signal of the charge pump should be operated in a higher frequency to maintain the driving capability of the output terminal. In addition, the built-in capacitor may always be accompanied by larger parasitic capacitors, and the excessively high frequency of the clock signal may cause that there is too much power consumed by the parasitic capacitors. Especially when the load is light, the excessively high frequency may result in an extremely low operating efficiency. In such a condition, if the frequency of the clock signal is too high, the parasitic capacitors may consume too much power, and if the frequency of the clock signal is too low, the driving capability of the output terminal may not be enough to immediately react to load variations.

The prior art provides a method of switching the frequency of the clock signal, wherein the clock signal may be switched to a first frequency having a higher value or a second frequency having a lower value. The system may detect the output voltage of the charge pump, and the second frequency is applied when the output voltage is higher than a threshold value and the first frequency is applied when the output voltage is lower than the threshold value. However, according to the above method, the operating frequency is switched between several fixed frequencies. These fixed frequencies cannot be adapted to any loading situations. For example, a loading may preferably be driven by an operating frequency between the first frequency and the second frequency; that is, the first frequency is too high and the second frequency is too low. In such a situation, the output voltage may fluctuate around the threshold value, and the operating frequency may be continuously switched between the first frequency and the second frequency, resulting in poor system stability. Moreover, the frequency is switched after a variation on the output voltage is detected, such that the output voltage inevitably possesses a certain level of fluctuation. If the load varies significantly, it is hard to maintain a stable output voltage. In such a condition, the prior art is only applicable to a circuit system having capacitive loads only, and cannot be applied to a circuit system having a larger resistive load. This is because the resistive load has a larger variation, which easily causes the output voltage instable.

Thus, there is a need to provide another method of adjusting the frequency of the clock signal, in order to control the charge pump to be operated in an optimal frequency and also prevent the above weak points.

SUMMARY OF THE INVENTION

It is therefore an objective of the present invention to provide a control method for adjusting an operating frequency of a charge pump in a power output circuit, where the operating frequency of the charge pump may be adjusted arbitrarily, allowing the charge pump to be operated in an optimal frequency according to the magnitude of load.

The present invention discloses a power output circuit, which comprises a charge pump, a voltage regulator, a clock generator and a voltage detector. The charge pump is used for receiving a clock signal having an operating frequency and outputting an output voltage. The voltage regulator, coupled to the charge pump, is used for outputting a control voltage to the charge pump, to control the output voltage. The clock generator, coupled to the charge pump, is used for outputting the clock signal to the charge pump. The voltage detector, coupled to the clock generator and the voltage regulator, is used for detecting the control voltage and controlling the clock generator to adjust the operating frequency of the clock signal according to a magnitude of the control voltage.

The present invention further discloses a control method for adjusting an operating frequency of a charge pump. The control method comprises outputting a control voltage to the charge pump, to control an output voltage of the charge pump; outputting a clock signal having the operating frequency to the charge pump; and detecting the control voltage and adjusting the operating frequency of the clock signal according to a magnitude of the control voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
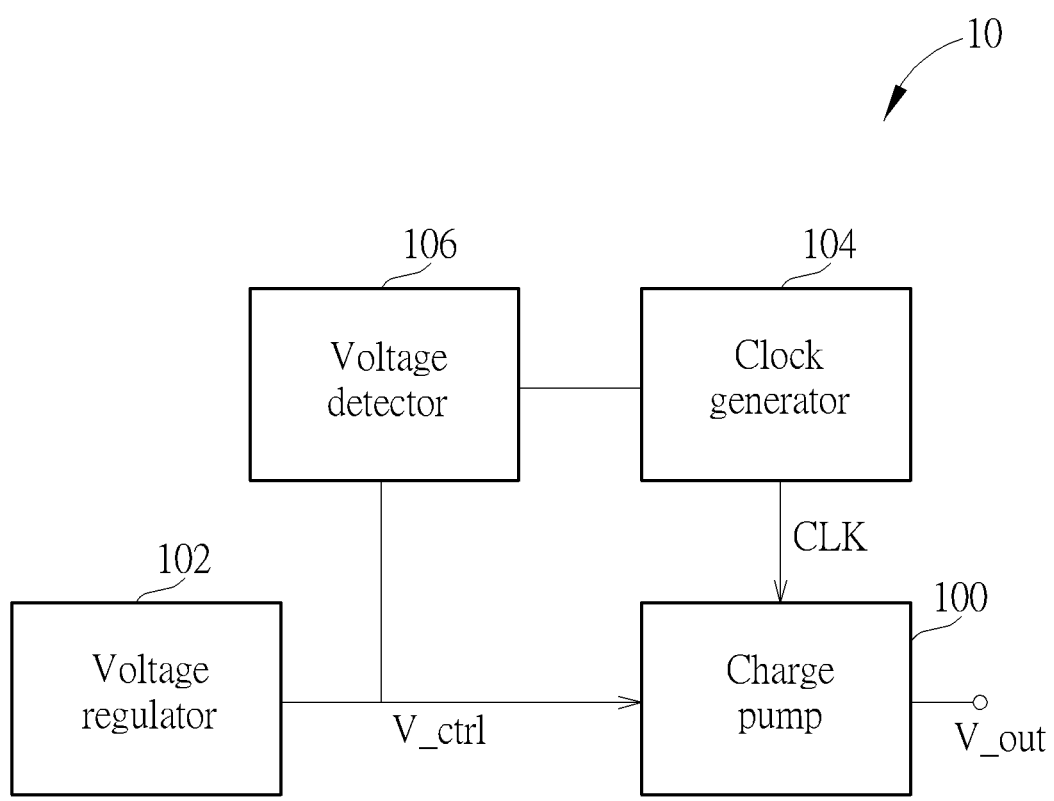
FIG. 1 is a schematic diagram of a power output circuit according to an embodiment of the present invention.

Please refer to FIG. 1, which is a schematic diagram of a power output circuit 10 according to an embodiment of the present invention. As shown in FIG. 1, the power output circuit 10 includes a charge pump 100, a voltage regulator 102, a clock generator 104 and a voltage detector 106. The charge pump 100 is used for receiving a clock signal CLK having an operating frequency and outputting an output voltage V_out. In detail, the charge pump 100 may include multiple capacitors, which are switched between different phases via the control of the clock signal CLK, in order to provide the electric charges in different capacitors for the load of the output terminal in different phases. The voltage regulator 102, coupled to the charge pump 100, may output a control voltage V_ctrl to the charge pump 100, to control the output voltage V_out. In detail, when the power output circuit 10 is launched, the power output circuit 10 may control the output voltage V_out to rise to a predetermined voltage value according to system configuration such as the resistance values of resistors in the voltage regulator 102. The output voltage V_out then remains at the predetermined voltage value. The voltage regulator 102 has a feedback circuit structure, which may receive the output voltage V_out from the output terminal of the power output circuit 10 and adjust the control voltage V_ctrl accordingly, in order to maintain the output voltage V_out at the predetermined voltage value. The clock generator 104, coupled to the charge pump 100, is used for outputting the clock signal CLK to the charge pump 100. The clock signal CLK generally refers to the positive and/or negative clock signal for controlling the operations of every switch in the charge pump 100. The voltage detector 106, coupled to the clock generator 104 and the voltage regulator 102, is used for detecting the control voltage V_ctrl and controlling the clock generator 104 to adjust the operating frequency of the clock signal CLK according to the magnitude of the control voltage V_ctrl. More specifically, the clock generator 104 may determine the time point of switching the clock signal CLK according to the magnitude of the control voltage V_ctrl.

Figure 2:
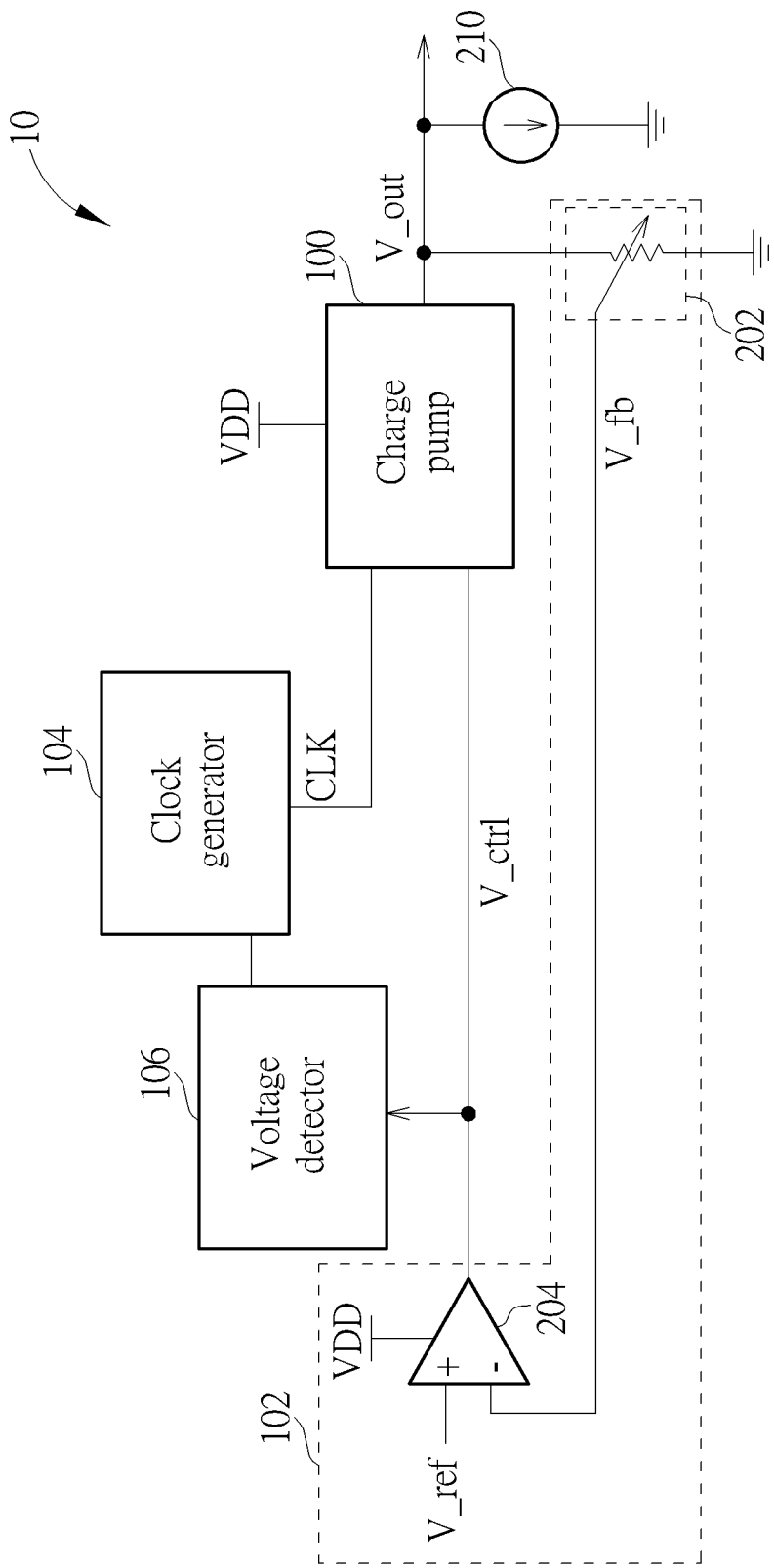
FIG. 2 is a schematic diagram of an implementation of the power output circuit shown in FIG. 1.

Please refer to FIG. 2, which is a schematic diagram of an implementation of the power output circuit 10. In FIG. 2, both of the charge pump 100 and the voltage regulator 102 receive an input voltage VDD. A load 210 is not included in the power output circuit 10, but is illustrated in FIG. 2 for easy understanding. As shown in FIG. 2, the voltage regulator 102 includes a feedback circuit 202 and an amplifier circuit 204. The feedback circuit 202 may receive the output voltage V_out from the charge pump 100 and generate a feedback signal V_fb accordingly. The amplifier circuit 204 then adjusts the magnitude of the control voltage V_ctrl according to the feedback signal V_fb, to maintain the output voltage V_out at the predetermined voltage value. In detail, the feedback circuit 202, which may be composed of a variable resistor or multiple voltage division resistors, is used to perform voltage division on the output voltage V_out and then generate the feedback signal V_fb. Subsequently, an input terminal of the amplifier circuit 204 receives the feedback signal V_fb from the feedback circuit 202, and another input terminal of the amplifier circuit 204 receives a reference voltage V_ref. Since the amplifier circuit 204 is operated with a negative feedback structure, the two input terminals are virtual short, so that the voltage value of the feedback signal V_fb is equal to the reference voltage V_ref. The amplifier circuit 204 also outputs the control voltage V_ctrl to the charge pump 100. According to the above feedback mechanism, the voltage regulator 102 may control the output voltage V_out of the charge pump 100 to be constant.

Figure 3:
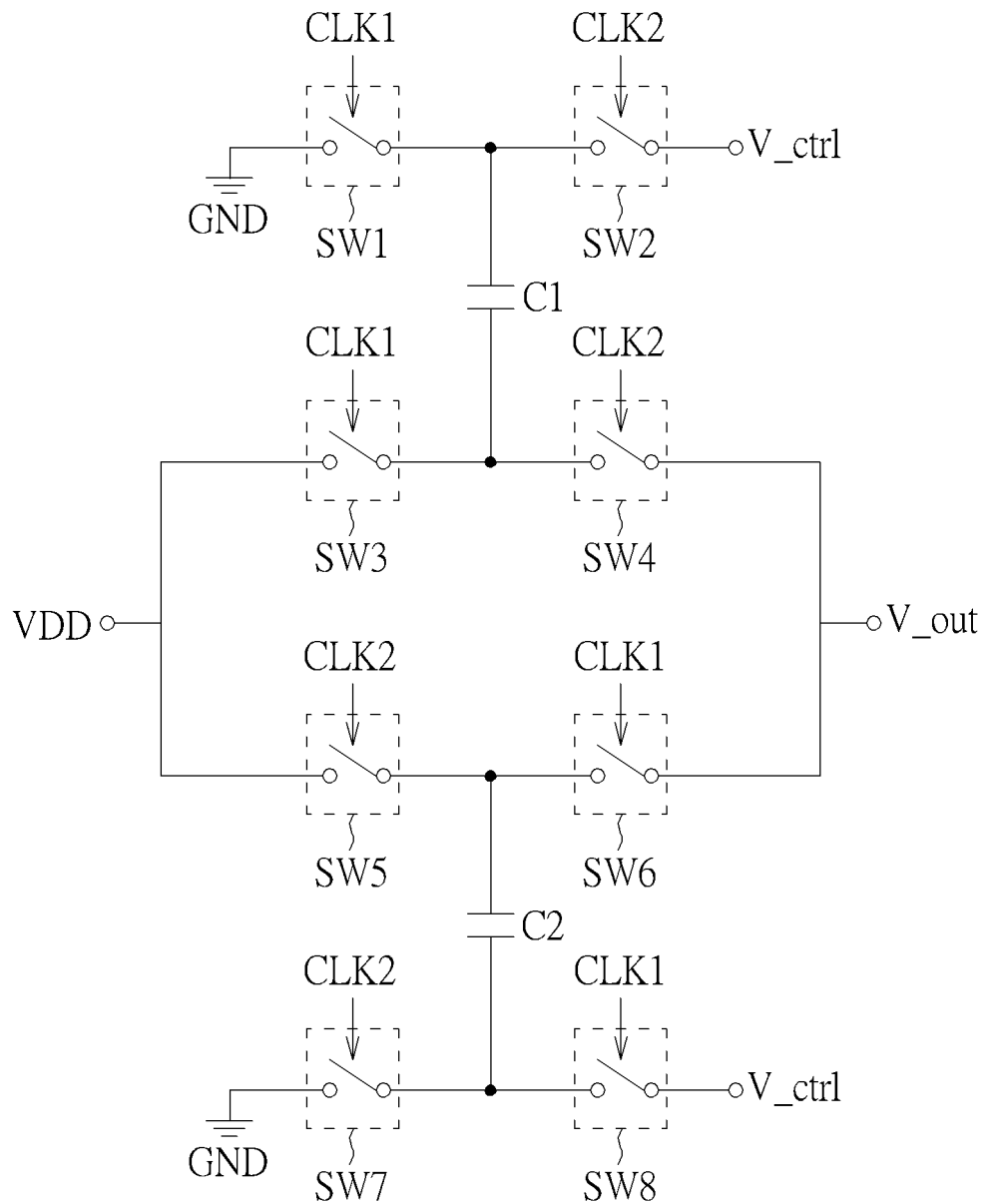
FIG. 3 is a schematic diagram of an implementation of the charge pump shown in FIG. 1.

Please refer to FIG. 3, which is a schematic diagram of an implementation of the charge pump 100. As shown in FIG. 3, the charge pump 100 includes capacitors C1, C2 and switches SW1-SW8. One terminal of the capacitors C1 and C2 is respectively coupled to the voltage regulator 102 via the switches SW2 and SW8 to receive the control voltage V_ctrl, or coupled to a ground terminal GND via the switches SW1 and SW7. Another terminal of the capacitors C1 and C2 is respectively coupled to a power input terminal via the switches SW3 and SW5 to receive the input voltage VDD, or coupled to a power output terminal of the power output circuit 10 via the switches SW4 and SW6 to generate the output voltage V_out. With the control of a positive clock signal CLK1 and a negative clock signal CLK2, the switches SW1-SW8 may switch the coupling methods of the capacitors C1 and C2. The capacitors C1 and C2 may raise the input voltage VDD to generate the output voltage V_out in different phases, respectively. Please note that each of the switches SW1-SW8 may include one or more transistors, or the switches SW1-SW8 may be implemented by other methods. In addition, for convenience of illustration, the circuit shown in FIG. 3 has the simplest charge pump structure. However, in order to realize different voltage requirements or different magnification ratios, the charge pump 100 may also be implemented with another circuit structure. In fact, as long as the circuit has a structure capable of controlling multiple capacitors to alternately generate an output voltage due to switching of the clock signal(s) and maintaining the output voltage at a predetermined voltage value via a voltage regulator, the control method of the present invention is applicable to adjust the operating frequency of the clock signal(s).

In a first phase, the positive clock signal CLK1 turns on the switches SW1, SW3, SW6 and SW8, and the negative clock signal CLK2 turns off the switches SW2, SW4, SW5 and SW7, allowing the capacitor C1 to be coupled between the power input terminal and the ground terminal GND and allowing the capacitor C2 to be coupled between the power output terminal and the voltage regulator 102. At this moment, the capacitor C1 may be charged by the input voltage VDD, to store electric charges from the input voltage VDD, and the capacitor C2 supplies power to the power output terminal. Subsequently, in a second phase, the positive clock signal CLK1 turns off the switches SW1, SW3, SW6 and SW8, and the negative clock signal CLK2 turns on the switches SW2, SW4, SW5 and SW7, allowing the capacitor C1 to be coupled between the power output terminal and the voltage regulator 102 and allowing the capacitor C2 to be coupled between the power input terminal and the ground terminal GND. In such a condition, the capacitor C1, which has been fully charged, starts to supply power to the power output terminal. That is, the capacitor C1 may output the stored electric charges and generate the output voltage V_out.

Please keep referring to FIG. 3 together with FIG. 2. In the second phase, the load 210 may draw currents from the capacitor C1, such that the electric charges stored in the capacitor C1 may decrease. In order to maintain the output voltage V_out at a specific value, the voltage in another terminal of the capacitor C1 (i.e., the control voltage V_ctrl of the voltage regulator 102) may rise gradually. However, the control voltage V_ctrl cannot rise unlimitedly. For example, since the voltage regulator 102 receives power from the input voltage VDD, the level of the control voltage V_ctrl may not exceed the input voltage VDD. Therefore, after the control voltage V_ctrl rises to be equal to the input voltage VDD, the output voltage V_out may start to fall if the load 210 keeps drawing currents. In order to prevent this situation, the present invention detects the magnitude of the control voltage V_ctrl via the voltage detector 106, and controls the clock generator 104 to switch the clock signals CLK1 and CLK2 to enter the first phase when detecting that the control voltage V_ctrl rises to nearly the input voltage VDD. At this moment, the capacitor C2, which has been fully charged in the second phase, may start to supply power to the power output terminal; that is, the load 210 may stop drawing currents from the capacitor C1 and draw currents from the capacitor C2 instead. As can be seen, with continuous switching of the clock signals CLK1 and CLK2, the capacitors C1 and C2 may supply power to the power output terminal alternately.

In an embodiment, assume that the input voltage VDD is equal to 6V and the output voltage V_out of the power output circuit 10 is equal to 10V. Right after the phase of the clock signal CLK is switched, the control voltage V_ctrl may be equal to 4V, and the output voltage V_out is raised to 10V via the feedback circuit 202. Subsequently, the load 210 starts to draw currents such that the electric charges stored in the capacitor decrease. At this moment, the control voltage V_ctrl may start to rise from 4V. When the control voltage V_ctrl rises to nearly the input voltage VDD, the voltage detector 106 may control the clock generator 104 to switch the clock signal CLK. At this moment, the control voltage V_ctrl may return to 4V and another capacitor may start to supply power to the power output terminal. In such a condition, a predefined voltage, which may be slightly lower than the input voltage VDD (e.g., 5.8V), is configured, where the voltage detector 106 may control the clock generator 104 to switch the clock signal CLK when detecting that the control voltage V_ctrl reaches the predefined voltage.

Please note that the predefined voltage is preferably configured to have a value slightly lower than the input voltage VDD, rather than exactly equal to the input voltage VDD. This configuration provides reaction time for signal transmission in the power output circuit 10. The above reaction time should be large enough to allow the voltage detector 106 to transmit a signal to the clock generator 104, to switch the clock signal CLK. In other words, the voltage detector 106 may determine the difference of the input voltage VDD and the control voltage V_ctrl. When the difference of the input voltage VDD and the control voltage V_ctrl is smaller than a threshold value such as 0.2V (i.e., 6V minus 5.8V), the voltage detector 106 may control the clock generator 104 to switch the clock signal CLK. Please also note that the level of the above predefined voltage or the threshold value may be configured according to system environments, and is not limited herein. For example, in a system with more frequent or larger load variations, the predefined voltage may be configured to have a lower value (e.g., 5.5V), i.e., the threshold value is equal to 0.5V, in order to maintain the stability of the output voltage V_out. In such a situation, the clock signal CLK is switched earlier to prevent the output voltage V_out from falling when the magnitude of load increases immediately.

In this manner, the present invention may control the clock signal CLK to switch its phase via detection of the control voltage V_ctrl. In such a condition, the frequency of the clock signal CLK is exactly determined by the speed of the load 210 drawing currents; that is, determined by the magnitude of load. Even if the load 210 of the power output terminal is a resistive load, the frequency of the clock signal CLK may be adjusted to the optimal frequency immediately when the load varies, and is not limited in the switching between specific fixed frequency values. This achieves a satisfactory stability and also prevents the parasitic capacitors from consuming too much power due to an excessive frequency. In such a situation, the power output circuit of the present invention is applicable to a resistive load system having large load variations. In addition, according to the present invention, the clock signal CLK may be switched when the control voltage V_ctrl approaches or rises to nearly the input voltage VDD but does not reach the input voltage VDD yet, which means that the phase is switched when the output voltage V_out has not fallen. In contrast to the prior art where the frequency is switched after a variation on the output voltage is detected, the present invention may switch the clock by detecting the control voltage when the output voltage does not change. As a result, the present invention may realize a more stable output voltage.

Figure 4A:
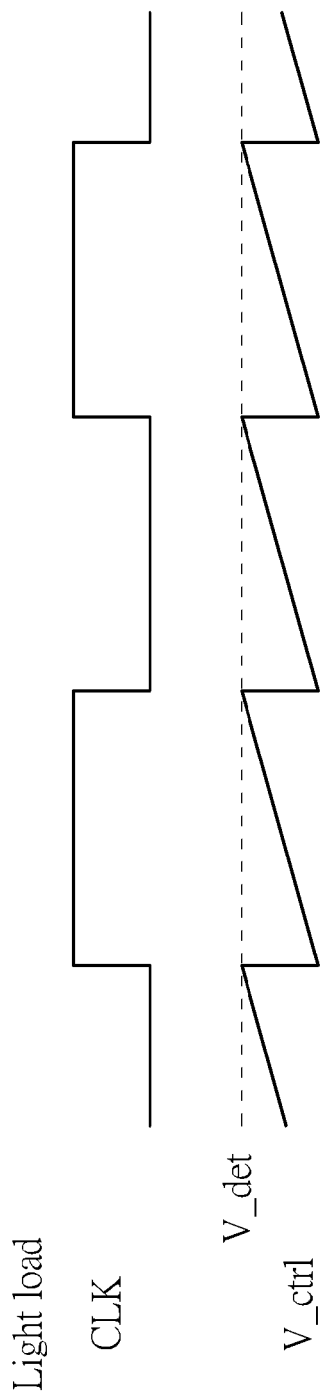
FIG. 4A and FIG. 4B are waveform diagrams of detecting the control voltage to switch the clock signal according to an embodiment of the present invention.
Figure 4B:
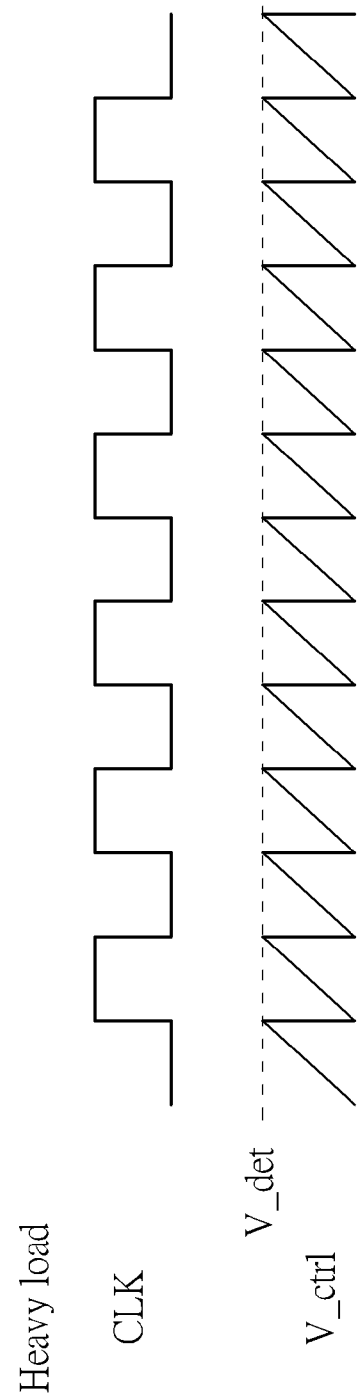

Please refer to FIG. 4A and FIG. 4B, which are waveform diagrams of detecting the control voltage V_ctrl to switch the clock signal CLK according to an embodiment of the present invention. FIG. 4A and FIG. 4B illustrate the examples of light load and heavy load, respectively. As shown in FIG. 4A, with a light load, the speed of the load 210 drawing currents from the capacitor is slower, so that the rising speed of the control voltage V_ctrl is slower. When the voltage detector 106 detects that the control voltage V_ctrl reaches the predefined voltage V_det, the clock generator 104 may switch the phase of the clock signal CLK. At this moment, since the load 210 is smaller, the phase switching speed of the clock signal CLK is slower, which means that the charge pump 100 is operated in a lower frequency. On the other hand, as shown in FIG. 4B, with a heavy load, the speed of the load 210 drawing currents from the capacitor is accelerated, so that the rising speed of the control voltage V_ctrl is faster, where the control voltage V_ctrl reaches the predefined voltage V_det (i.e., approaches the input voltage VDD) more rapidly. In such a condition, the speed of the clock generator 104 switching the clock signal CLK is also accelerated. At this moment, since the load 210 is larger, the phase switching speed of the clock signal CLK is faster, which means that the charge pump 100 is operated in a higher frequency. As a result, the charge pump 100 may be operated in an optimal frequency according to the magnitude of load. This prevents the parasitic capacitors from consuming too much power due to an excessive operating frequency, and also prevents that the output voltage V_out cannot immediately react to the variations of the load 210 due to an insufficient operating frequency.

Please note that the present invention provides a charge pump and a power output circuit which can be operated in an optimal frequency and a related control method. Those skilled in the art can make modifications and alternations accordingly. For example, the above circuit structure is only one of various possible implementations of the present invention. In another embodiment, the clock generator may be included in the voltage detector, so that the voltage detector may switch the clock signal when detecting that the control voltage approaches or rises to nearly the input voltage. In addition, the level of the input voltage or the reference voltage may be arbitrarily adjusted according to requirements of the output voltage. Those skilled in the art may also change the circuit structure of the charge pump according to system requirements.

Figure 5:
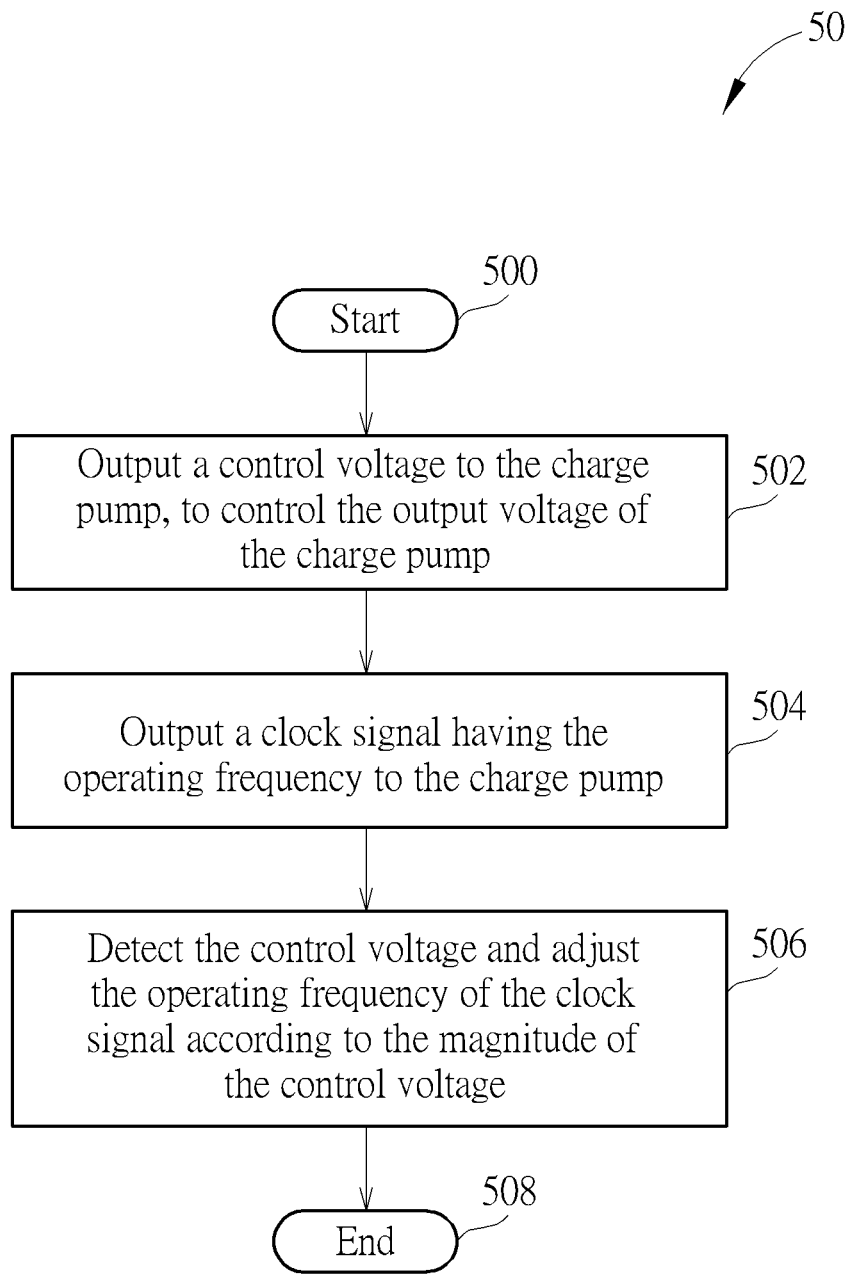
FIG. 5 is a flow chart of a process according to an embodiment of the present invention.

The above operations related to the power output circuit 10 may be summarized into a process 50, as shown in FIG. 5. The process 50 may be utilized for adjusting the operating frequency of a charge pump, and includes the following steps:

Step 500: Start.
Step 502: Output a control voltage to the charge pump, to control the output voltage of the charge pump.
Step 504: Output a clock signal having the operating frequency to the charge pump.
Step 506: Detect the control voltage and adjust the operating frequency of the clock signal according to the magnitude of the control voltage.
Step 508: End.

Detailed operations and alternations of the process 50 are illustrated in the above descriptions, and will not be narrated herein.

To sum up, the present invention provides a control method capable of adjusting the operating frequency of the charge pump in the power output circuit. The operating frequency of the charge pump may be adjusted with variations of the magnitude of load, and is not limited to the switching between specific fixed frequency values. In an embodiment, the charge pump receives a control voltage from a voltage regulator, and maintains its output voltage at a predetermined voltage value via a negative feedback circuit structure. By detecting the magnitude of the control voltage, the time point of switching the clock signal of the charge pump is determined, in order to determine the operating frequency of the clock signal. As a result, the present invention may switch the phase by detecting the control voltage when the output voltage does not vary, in order to realize a more stable output voltage. In addition, the clock signal may achieve its optimal operating frequency with any magnitudes of load. This prevents the parasitic capacitors from consuming too much power due to an excessive operating frequency, and also prevents that the output voltage cannot immediately react to the load variations due to an insufficient operating frequency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power output circuit, comprising:
    a charge pump, for receiving a clock signal having an operating frequency and outputting an output voltage;
    a voltage regulator, coupled to the charge pump, for outputting a control voltage to the charge pump, to control the output voltage;
    a clock generator, coupled to the charge pump, for outputting the clock signal to the charge pump; and
    a voltage detector, coupled to the clock generator and the voltage regulator, for detecting the control voltage and controlling the clock generator to adjust the operating frequency of the clock signal according to a magnitude of the control voltage;
    wherein the voltage detector determines whether the control voltage is greater than a predefined voltage, and controls the clock generator to switch the clock signal only when the control voltage is greater than the predefined voltage.

2. The power output circuit of claim 1, wherein the charge pump comprises:
    a first capacitor and a second capacitor, for raising an input voltage to generate the output voltage; and
    a plurality of switches, for switching a coupling method of the first capacitor and the second capacitor according to a control of the clock signal.

3. The power output circuit of claim 2, wherein in a first phase, the clock signal controls the first capacitor to be coupled between a power input terminal and a ground terminal, allowing the first capacitor to receive the input voltage and store electric charges of the input voltage.

4. The power output circuit of claim 3, wherein in a second phase, the clock signal controls the first capacitor to be coupled between a power output terminal and the voltage regulator, to output the electric charges stored in the first capacitor and generate the output voltage.

5. The power output circuit of claim 4, wherein in the second phase, a load of the power output terminal draws currents from the first capacitor, such that the electric charges stored in the first capacitor decreases and the control voltage rises to maintain the output voltage at a predetermined voltage value.

6. The power output circuit of claim 5, wherein the clock generator switches the clock signal to enter the first phase when the control voltage rises to nearly the input voltage, and the load stops drawing currents from the first capacitor and draws currents from the second capacitor instead in the first phase.

7. The power output circuit of claim 6, wherein a speed of drawing currents from the first capacitor is accelerated when the load is increased, so that the control voltage has a faster rising speed and approaches to the input voltage more rapidly, which in turn accelerates a speed of the clock generator switching the clock signal, in order to increase the operating frequency of the clock signal.

8. The power output circuit of claim 2, wherein the clock generator switches the clock signal when a difference of the input voltage and the control voltage is smaller than a threshold value.

9. The power output circuit of claim 1, wherein the voltage regulator comprises:
    a feedback circuit, for receiving the output voltage from the charge pump and generating a feedback signal accordingly; and
    an amplifier circuit, for adjusting the magnitude of the control voltage according to the feedback signal, to maintain the output voltage at a predetermined voltage value.

10. A control method for adjusting an operating frequency of a charge pump, comprising:
    outputting a control voltage to the charge pump, to control an output voltage of the charge pump;
    outputting a clock signal having the operating frequency to the charge pump; and
    detecting the control voltage and adjusting the operating frequency of the clock signal according to a magnitude of the control voltage by determining whether the control voltage is greater than a predefined voltage and controlling the clock signal to be switched only when the control voltage is greater than the predefined voltage.

* * * * *